United States Patent
Haulotte et al.

(10) Patent No.: US 6,815,615 B1
(45) Date of Patent: Nov. 9, 2004

(54) TWO-PART GROMMET

(75) Inventors: Jodi M. Haulotte, Livonia, MI (US); Brian L. Wagner, Ypsilanti, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/652,777

(22) Filed: Aug. 29, 2003

(51) Int. Cl.[7] .............................................. H02G 3/18
(52) U.S. Cl. ........................... 174/65 G; 174/153 G; 174/152 G; 174/135; 16/2.1; 248/56
(58) Field of Search .................... 174/65 G, 72 A, 174/100, 80, 82, 74 A, 135, 152 R, 153 G, 142, 152 G, 151; 248/56; 16/2.1, 2.2; 439/274, 275, 607, 587; 362/487, 459

(56) References Cited

U.S. PATENT DOCUMENTS

| | | | |
|---|---|---|---|
| 4,656,689 A | | 4/1987 | Dennis |
| 4,839,937 A | | 6/1989 | Oikawa et al. |
| 4,912,287 A | | 3/1990 | Ono et al. |
| 4,928,349 A | * | 5/1990 | Oikawa et al. ......... 174/153 G |
| 4,966,374 A | | 10/1990 | Oikawa et al. |
| 5,300,734 A | * | 4/1994 | Suzuki ..................... 174/135 |
| 5,337,447 A | * | 8/1994 | Tanaka et al. .......... 174/153 G |
| 5,360,945 A | | 11/1994 | Truesdale, Jr. et al. |
| 5,448,017 A | * | 9/1995 | Nakajima et al. ......... 174/65 G |
| 5,557,073 A | | 9/1996 | Truesdale, Jr. et al. |
| 5,736,677 A | * | 4/1998 | Sato et al. ................ 174/65 G |
| 6,341,405 B1 | * | 1/2002 | Uchida ........................ 16/2.1 |
| 6,553,615 B1 | * | 4/2003 | Hansen et al. .......... 174/152 G |

* cited by examiner

*Primary Examiner*—Dean A. Reichard
*Assistant Examiner*—Angel R. Estrada
(74) *Attorney, Agent, or Firm*—Young & Basile, P.C.

(57) ABSTRACT

A two-part grommet assembly for routing wiring and/or washer fluid conduit through an aperture in automotive bodywork to a spoiler mounted CHMSL/rear window washer. The grommet assembly includes a first soft pliable component having a tubular portion and a bell-shaped portion, the latter being configured to provide an interior annular volume to receive the external flange of a second component made of a relatively stiff material. The second component is configured to snap into the aperture in the automotive bodywork to mount the grommet on the exterior of the vehicle and/or within a spoiler assembly. Complemental retention structure is provided within the annular retainer volume which receives the flange of the snap lock component and compression of the materials during installation enhances the retention function.

11 Claims, 4 Drawing Sheets

TWO-PART GROMMET

FIELD OF THE INVENTION

This invention relates to grommets for leading wires, tubular conduit, and the like through automotive bodywork with a reduced concern for chafing and wear, and also for providing a seal.

BACKGROUND OF THE INVENTION

It is known to provide flexible rubber or rubber-like grommets for leading wires, cables, tubes and the like through apertures in automotive bodywork. In general, the purpose of grommets is to reduce concern for chafing and wear due to movement of the wires, cables or tubes or combinations thereof and also to provide a dust and moisture seal, especially where the aperture defines an interface between the interior of the bodywork and the outside world. Examples of grommets are disclosed in U.S. Pat. No. 4,912,287 issued Mar. 27, 1990, U.S. Pat. No. 4,839,937 issued Jun. 20, 1989; U.S. Pat. No. 4,656,689 issued Apr. 14, 1987; U.S. Pat. No. 4,966,374 issued Oct. 30, 1990; and U.S. Pat. No. 5,360,945 issued Nov. 1, 1994. Not all of the above mentioned prior art devices are intended for use in an automotive environment. Prior art two-part grommets have been found to provide insufficient retention between the parts. This can result in separation in use.

SUMMARY OF THE INVENTION

The present invention provides a two-part grommet assembly, a first component which is made of a relatively soft or pliable material for receiving and directing the wiring, cable, tubes, and or combinations thereof through an automotive bodywork aperture, and a second component which is made of a less resilient, more rigid material which is inserted into the first component after manufacture thereof so as to provide an external locking structure for insertion into mechanical collaboration with the bodywork aperture. In accordance with the invention, the soft pliable component has a bell-shaped portion with spaced parallel annular walls defining an interior annular flange retention volume. The more rigid component comprises in part an external annular flange which fits snugly into the interior annular retention volume. In addition, the more rigid component comprises a locking section, generally cylindrical in overall configuration, which extends externally of the bell-shaped portion of the grommet body component so as to be insertable in a snap-fit relationship with the automotive bodywork aperture.

In accordance with the invention, the first component comprises an annular seal skirt as well as elements which are complemental to the flange of the second less resilient component to provide an enhanced retainer function.

In the illustrative embodiment, the grommet is L-shaped so as to provide an essentially 90-degree routing angle for the routed material and the grommet is shown to be particularly useful in connection with providing wiring to a CHMSL and/or a rear spoiler mounted window washer.

Other applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawings wherein like reference numerals refer to like parts throughout the several views, and wherein.

DETAILED DESCRIPTION OF THE PREFERRED EMBODIMENT

Figure 1:
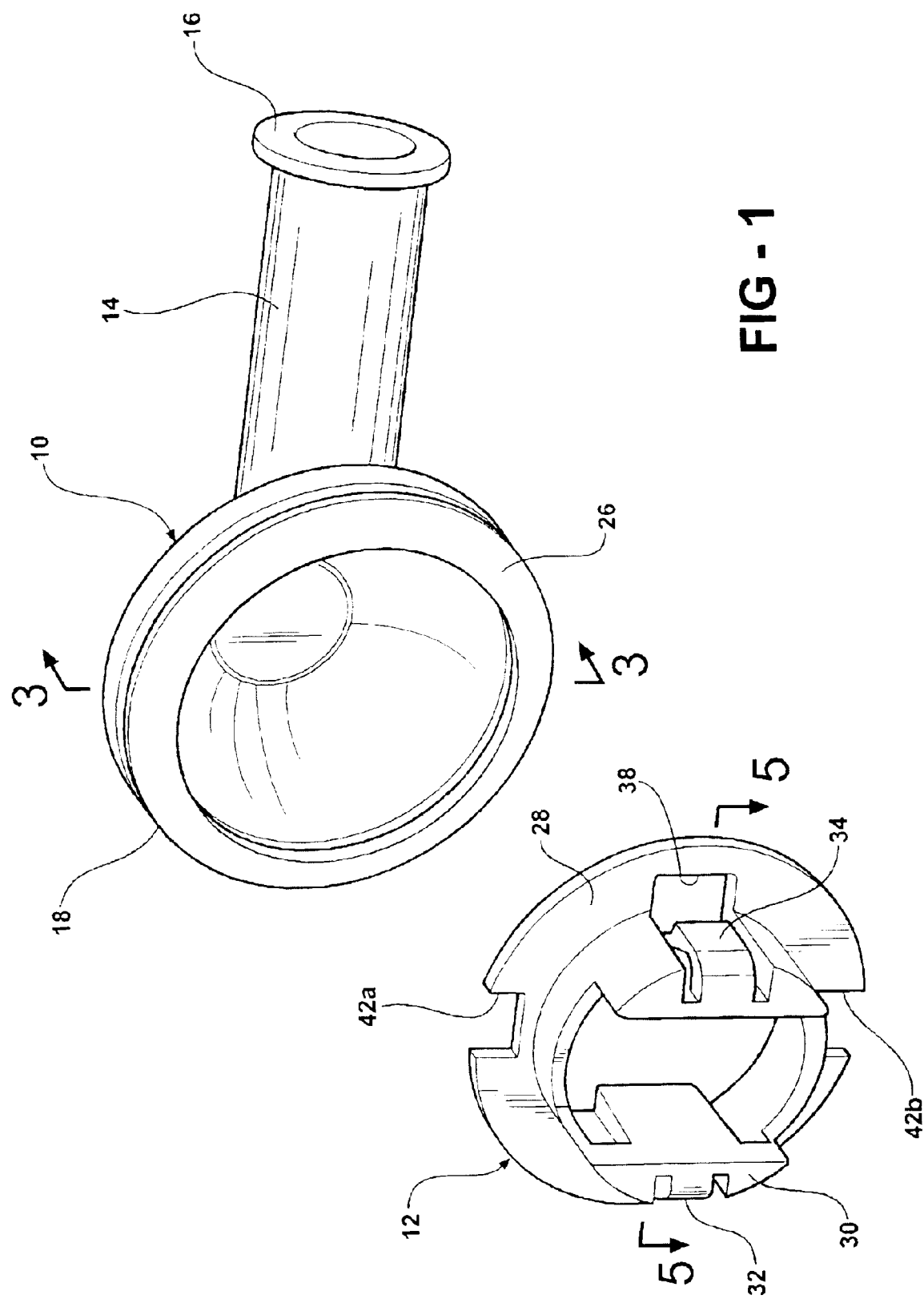
FIG. 1 is a perspective drawing of the two components of an illustrative embodiment of the invention in disassembled condition.

Referring now to the various figures of the drawing, the grommet assembly of the present invention comprises a first grommet body 10 made of a relatively soft, flexible material such as EPDM rubber and a second inner component 12 made of a relatively rigid plastic such as high-density polyethylene. The grommet body 10 comprises a conduit portion 14 having a flange 16 at the output or terminal end thereof, and a bell-shaped portion 18. Both of the grommet body 10 and inner component 12 are preferably injection molded.

Figure 4:
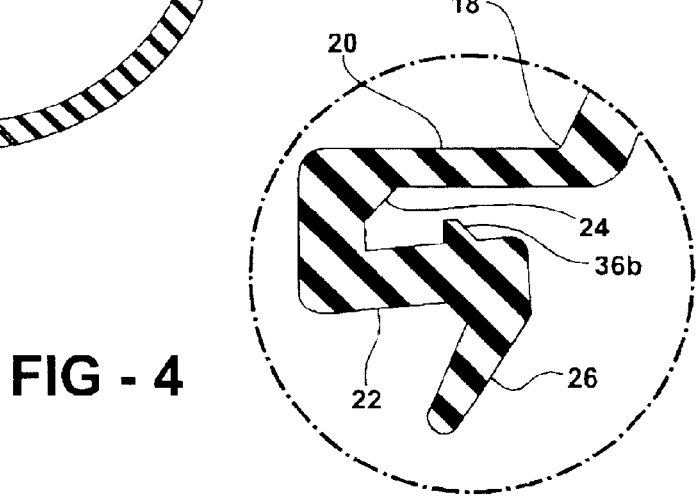
FIG. 4 is a detail of the annular retainer volume of the grommet body.

The bell-shaped portion 18, as best shown in FIG. 4, comprises spaced parallel upper and lower annular walls 20 and 22 defining therebetween an interior annular retainer volume 24. Integral with the lower wall 22 is a flexible annular seal skirt 26 the function of which is illustrated in FIG. 2 and hereinafter described.

Figure 5:
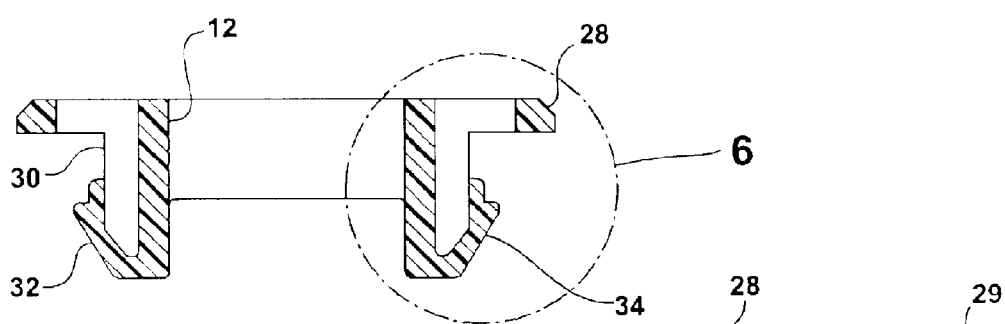
FIG. 5 is a cross section through the stiff second component of the embodiment of FIG. 1.
Figure 6:
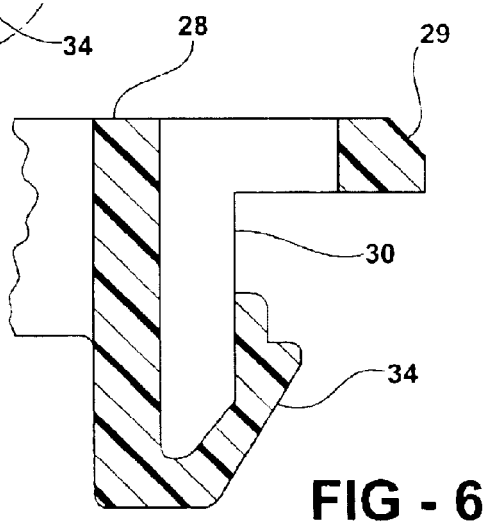
FIG. 6 is a detail of the component of FIG. 1

The second component 12 comprises a generally annular exterior flange 28 having a beveled edge 29 and sized and shaped to fit snugly within the retainer volume 24 of the first component 10. In addition, the second component 12 comprises a generally cylindrical and externally extending locking portion 30 having diametrically opposite resilient fingers 32 and 34 spaced from the flange 28 as best shown in FIGS. 2 and 5 to provide a snap-in locking feature with an aperture in automotive bodywork 50 hereinafter described with reference to FIG. 2. When the component 12 is properly installed in the component 10 with the flange 28 within the retainer volume 24, the locking portion 30 extends externally of the first component 10 so as to be easily snapped into an appropriately sized aperture or hole in an automotive bodywork or such other structure in which the device is to be installed.

Figure 2:
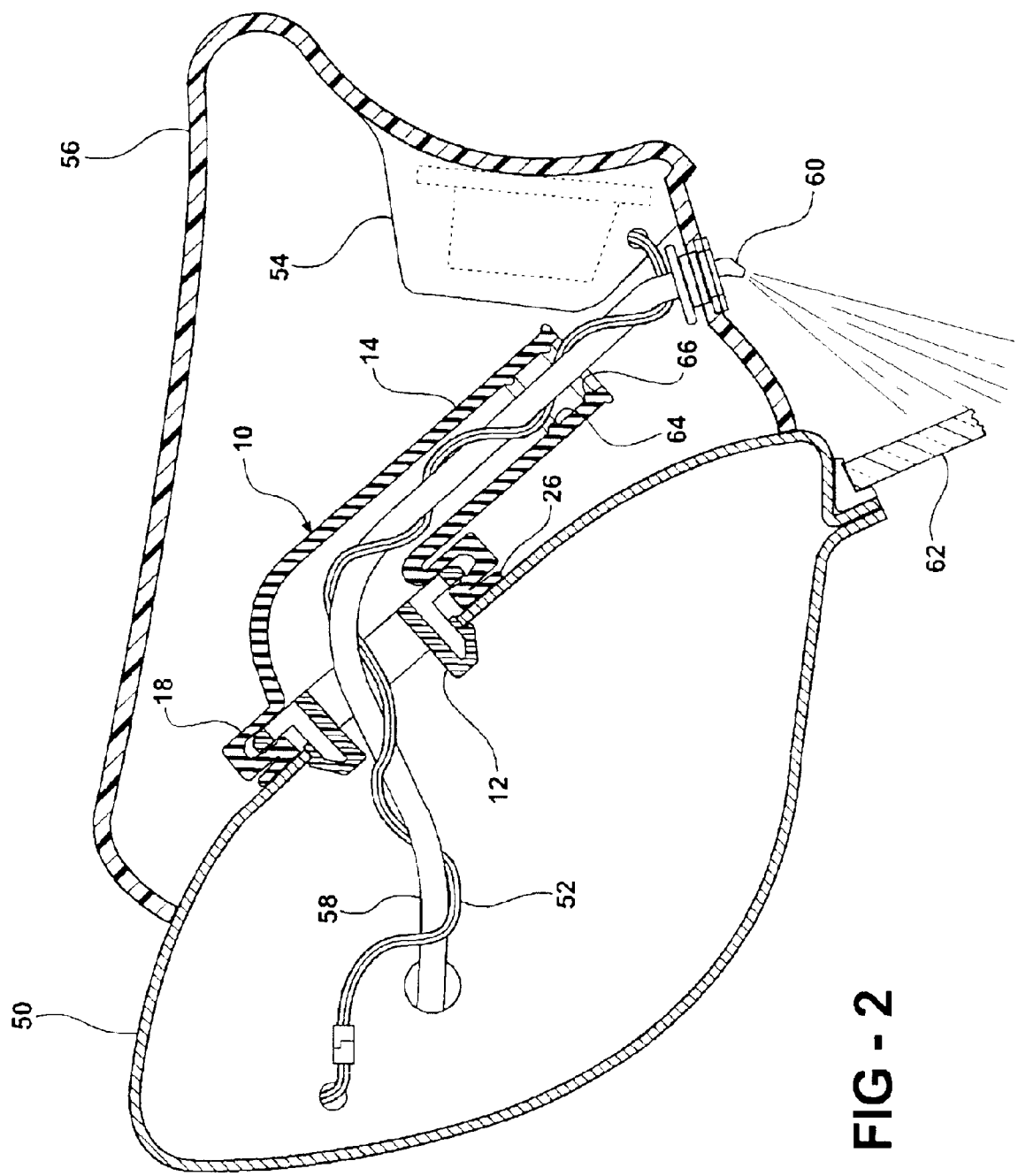
FIG. 2 is a sectional view of an industrial application of the device of FIG. 1 to provide both electrical wiring to a spoiler mounted CHMSL and washer fluid to a rear window.

In the embodiment shown in FIG. 2, the axis of symmetry of the conduit portion 14 is at right angles to the axis of symmetry of the bell-shaped mouth portion 18 but this is merely illustrative, i.e., single axis, offset axis and/or various angular arrangements are all within the scope of the invention with only minor structural variations.

Figure 3:
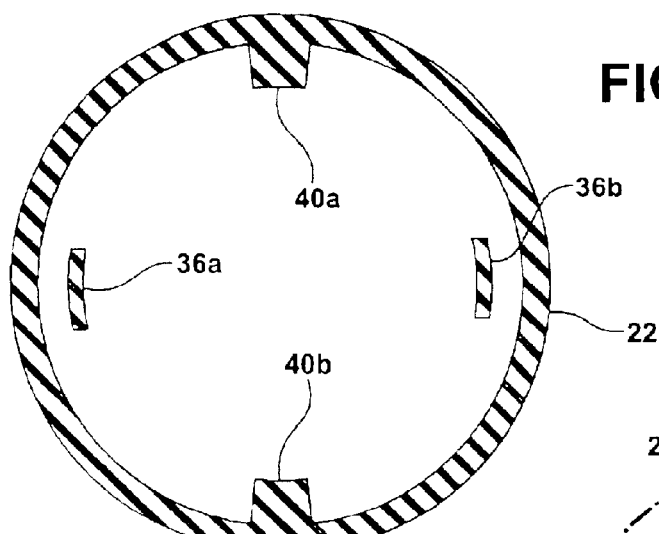
FIG. 3 is a plan view in section of a portion of the grommet body.

As shown in FIG. 3, the lower wall 22 is injection molded so as to define a pair of diametrically opposite retainer tabs 36a and 36b. These tabs cooperate with complemental slots or apertures 38 in the second component 12 to enhance the retention of the second component within the annular retainer volume 24. In addition, locator tabs 40a and 40b are formed on the inside lower wall 22 and cooperate with notches 42a and 42b in the flange 28 to ensure that the second component 12 is properly oriented and located within the first component 10 when installed.

It is apparent that the two components 10 and 12 are independently and separately injection molded of the suitable plastic material and are thereafter joined by manipulation of the soft pliable material of the first component 10 so as to properly receive and hold the flange 28 of the second component 12.

FIG. 2 shows an industrial application of the present device in a portion of automotive bodywork 50 designed to receive wiring 52 for a center high-mounted stop light or CHMSL 54 mounted in the interior of a rear high-mounted spoiler 56 found on vehicles commonly known as "Sport Utility Vehicles" or "SUVs." In addition, and in this instance, tubular conduit 58 is also directed through the grommet assembly 10, 12 to provide washer fluid to a nozzle 60 which is directed toward a back window 62 forming part of the vehicle structure. In the installed condition shown in FIG. 2 it will be observed that the seal 26 is flattened against the bodywork and that the sizing of the component 12 and particularly that the axial depth thereof is such as to squeeze or compress walls 20 and 22 toward one another to further enhance the effectiveness of the retention feature.

Annular interior seal rings or beads 64 and 66 are provided near the flared distal end 16 of the grommet component 10, it being understood that the wiring 52 and tubular conduit 58 are typically wrapped with tape so as to increase and smooth out the effective diameter thereof in the area of the seal structure 64, 66. This makes the routed materials larger to effectuate the seal with rings 64, 66. Alternatively, the routed materials can be and often are large enough so that tape is not required to provide a sealing function. Two axially spaced seal rings are preferred in the event that movement or flexing of the structure permits moisture to get past the first seal.

Figure 7:
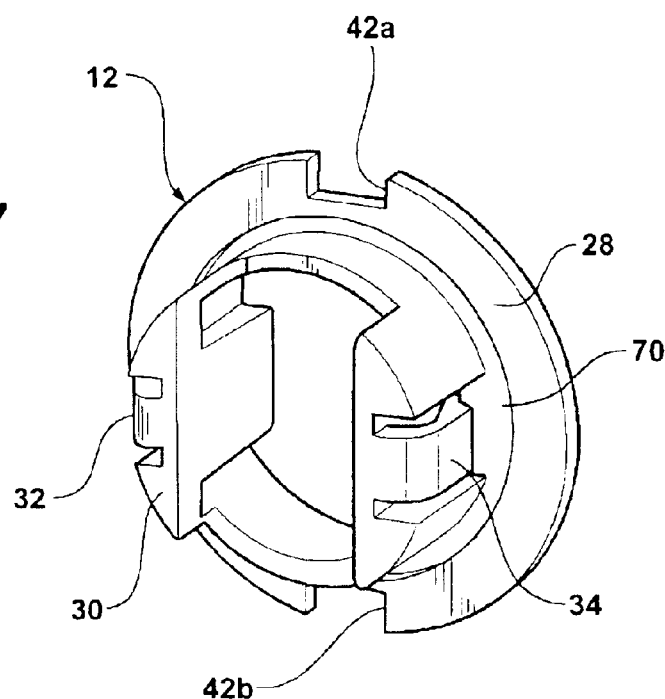
FIG. 7 is a perspective drawing of an inner grommet component according to a second embodiment of the invention.
Figure 8:
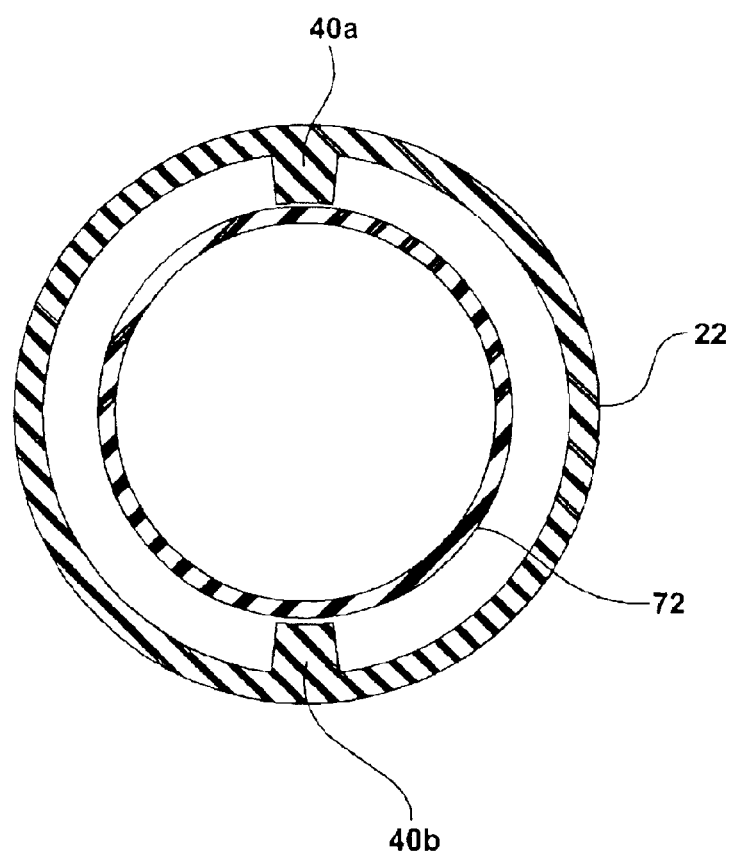
FIG. 8 is a plan view in section of a grommet body for use with the inner grommet component of FIG. 7.

For larger-sized grommets used in other locations on the vehicle, for example in the dashboard area, the invention features can be modified to provide improved retention between the grommet body and inner component. FIGS. 7 and 8 illustrate this modification. The flange 28 of the inner component can be made thicker in a larger-sized grommet. The slot or apertures 38 in the inner component flange are replaced by a circular groove 70 extending along the flange inward from the notches 42a and 42b and outward from the locking portion 30. The increased thickness enables the flange to accommodate this groove. The tabs 36a and 36b on the lower annular wall 22 of the grommet body are replaced by a single circular tab 72 extending completely along the wall. The tab 72 is sized to fit in the groove 70 to enhance the retention of the inner component to the grommet body.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A snap-in grommet assembly for installation in an automotive bodywork aperture comprising:

a first relatively flexible component having an elongate conduit portion and an integral bell-shaped portion of a diameter which is greater than the diameter of the conduit portion and which has an open mouth, the bell-shaped portion having an annular retainer portion defined by parallel spaced first and second annular walls defining an interior annular retainer volume therebetween; and a second relatively stiff component comprising an annular exterior flange sized to fit complementally into the annular retainer volume, and a smaller diameter locking portion for snapping into the bodywork aperture, the locking portion extending axially from the flange therefrom so as to extend through the open mouth and be external of the bell-shaped portion when the flange is installed in the retainer volume;

said flange and at least one of the annular walls defining said volume having complemental retention elements formed therewith to secure the second component within the first component.

2. A grommet assembly as defined in claim 1 wherein said retention elements comprise tabs on one of said walls in said annular retainer volume extending into said volume, and apertures to receive said tabs in said flange when the flange is installed in the retainer volume.

3. A grommet assembly as defined in claim 1 wherein said retention elements comprise an annular tab on one of said walls in said annular retainer volume extending into said volume, and an annular groove in said flange to receive said annular tab when the flange is installed in the retainer volume.

4. A grommet assembly as defined in claim 1 wherein said first component is L-shaped.

5. A grommet assembly as defined in claim 4 further including notches formed in said flange and locator tabs formed in said interior volume.

6. A grommet assembly as defined in claim 1 wherein said second component is injection molded to comprise a large diameter flange and a smaller diameter cylindrical portion having diametrically opposite resilient snap tabs.

7. A grommet assembly as defined in claim 1 wherein said first component further comprises a flexible seal skirt around said mouth and flaring outwardly therefrom.

8. The snap-in grommet assembly of claim 1 further comprising a first bodywork component having an aperture formed therein and a second bodywork component disposed on the first bodywork component over said aperture and including a lighting fixture having wiring;

the snap-in grommet assembly routing said wiring through said first bodywork component aperture;

said smaller diameter locking portion extending through the bodywork aperture in snap-fit relationship therewith.

9. An automotive lighting assembly comprising:

a first bodywork component having an aperture formed therein and a second bodywork component disposed on the first bodywork component over said aperture and including a lighting fixture having wiring;

a snap-in grommet assembly for installation in said aperture for routing said wiring through said aperture, said grommet assembly comprising:

a first relatively flexible component having an elongate conduit portion and an integral bell-shaped portion of a diameter which is greater than the diameter of the conduit portion and which has an open mouth, a seal skirt around the mouth and an annular retainer portion defined by parallel spaced first and second walls defining an interior annular retainer volume therebetween; and a second relatively stiff component comprising an exterior annular flange sized to fit complementally into the annular retainer volume, and a locking portion extending axially therefrom so as to be external of the bell-shaped portion when installed therein;

said flange and at least one wall defining said volume having complemental retention elements formed therewith to secure the second component within the first component.

10. An assembly as defined in claim 9 wherein said seal skirt is formed around the mouth and flares outwardly therefrom.

11. An assembly as defined in claim 9 further including seal means in the conduit portion of said first assembly.

* * * * *